Aug. 19, 1958 H. F. SILVER 2,847,766
DRIER
Filed Nov. 5, 1954 2 Sheets-Sheet 1

INVENTOR.
HAROLD F. SILVER
BY
McGrew & Edwards
ATTORNEYS

United States Patent Office 2,847,766
Patented Aug. 19, 1958

2,847,766

DRIER

Harold F. Silver, Denver, Colo., assignor to Silver Engineering Works, Inc., a division of Silver Corporation, Denver, Colo., a corporation of Colorado Application November 5, 1954, Serial No. 467,059

3 Claims. (Cl. 34—57)

This invention relates to improvements in driers and more particularly to improvements in fluidized driers in which wet solids are suspended in a rising high velocity drying gas in a drying chamber.

Fluidized or suspended drying is a well known process for drying low cost, wet solids; where wet solids are suspended and dried in high velocity hot gases. In one type of apparatus, especially for drying wet low rank coal, a combustion furnace provides hot gases of combustion which are directed, at a relatively high velocity, into the bottom of a drying chamber and are passed upwardly through the drying chamber. Wet coal is suspended in the rising gas and as the coal dries it becomes lighter and is carried out of the chamber with the gas and into a separator where the product is separated from the spent drying gas. Normally, a fluidized drying chamber has an inverted conical bottom portion; the lower or small end of the conical bottom is interconnected with a source of hot drying gas. The gas enters the small end of the drying chamber at a relatively high velocity so as to entrain solids in the rising stream of gas. The upper portion of the chamber is substantially cylindrical, of about the same diameter as the top of the inverted cone. Wet solids are introduced into the conical section of the drier where there is a rising stream of high velocity gas. An outlet is provided at the top of the chamber for exhausting dry product and spent gases from the chamber. The outlet for the chamber is substantially smaller than the cylindrical section thereof so that there is an increase of velocity exhausting from the chamber to aid in carrying out the dried product. In one modification of the drying chamber, spinning vanes are provided in the lower portion of the conical bottom or throat section of the chamber so as to entrain solids which fall from the feed into the throat section. Straightening vanes in the conical section provide for the suspending and fluidizing of the major portion of solids in the rising stream of gas. The spinning vanes provide means for breaking up lumped, finely divided wet solids and for entraining particles which are too heavy to be suspended in the gas passing the feed inlet.

Included among the objects and advantages of the present invention is an improvement which provides means for spreading wet solids substantially uniformly across the diameter of a fluidized drying chamber. The invention prevents channelling of the solids in the center of the drier, and, also, provides a system in which wet solids have a longer residence time in the drier. The invention provides a drier which efficiently drys wet solids which include a substantial amount of inherent moisture as well as surface moisture on the solids. The invention further includes a drier in which wet solids are distributed across the drying column to utilize substantially the full capacity of the drier.

These and other objects and advantages of the invention may be more readily ascertained by referring to the following description and illustrations in which.

Figure 1:
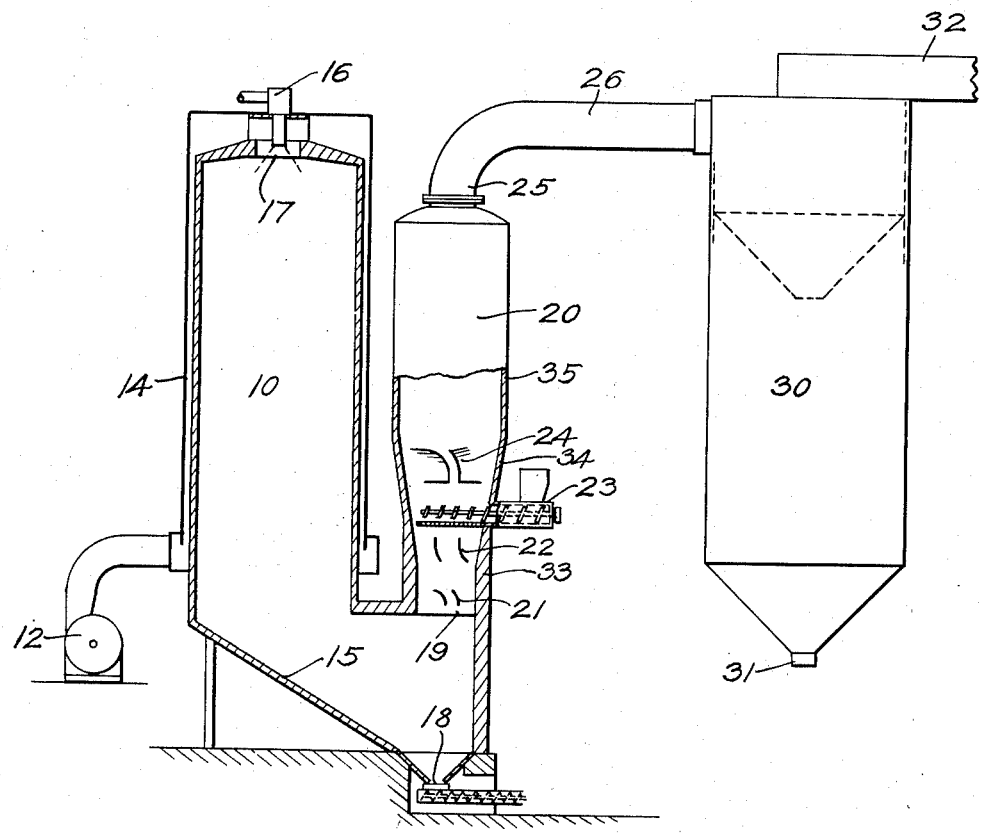
Figure 1 is a side elevation of an assembly incorporating the drier of the invention, illustrating generally the system for a fluidized drier.

In the fluidized drying system illustrated in Figure 1, a furnace 10 provides hot gases of combustion for use in drying wet coal or fuel or other finely divided material and the like. The furnace is a vertical type furnace providing a downwardly directed burner so that hot gases of combustion sweep down and out of the bottom of the furnace. A blower 12 provides air for the combustion. Air from blower 12 is directed into the outer covering or heat exchanger 14 of the furnace which heats the air prior to its entry into the furnace. The hot air is mixed with fuel in a burner 17 at the top of the furnace. A fuel inlet 16 is connected with the burner 17 to provide fuel for the furnace. The fuel may be oil, gas, coal dust, and the like for generating a large volume of hot gases of combustion. As the hot gases of combustion sweep down from the burner in the furnace, they strike an inclined bottom 15 which deflects the gas and directs it into the bottom of an upright drying column 20. The change in direction and velocity of the deflected gases aids in separating of ash and slag which are suspended in the hot gases. The ash and slag flow into a sump 18 where they are removed.

The hot gases of combustion sweep along the bottom of the furnace and into a throat 19 at the bottom of a vertical, fluidized drying chamber 20. The throat 19 is relatively small compared to the main cylindrical section of the drier so that the gases in the throat section 19 have a considerably higher velocity than the gases in the main body of the drier. The hot gases entering the throat 19 of the drying chamber 20 pass through the lower spinning vanes 21 which rapidly spin or rotate the gases in the throat. The rapidly spinning gases pick up large, heavy particles of agglomerated, wet finely divided solids which have dropped past straightening vanes 22, described hereinafter. The spinning vanes 21 aid in breaking up some of the agglomerated lumps, and, also, aid in suspending large particles in the high velocity gases. Only the very largest particles, if any, drop past the spinning vanes 21 into the sump where they are removed with the ash or slag. The lower spinning vanes also provide means for spreading the solids across the throat so that they are evenly distributed in the gas. The straightening vanes 22 provide a high velocity, streamline flow of gas which entrains a major portion of particles as they are discharged from the wet product feed 23. The streamline flow travels upwardly in the drier through an inverted conical section 34 which pemits the gases to expand, and, therefore, the velocity of the gases decreases. The streamline flow, however, tends to permit channelling of the gases, i. e., a high velocity central stream flows up the column while the peripheral portions of the gases are of considerably lower velocity. As the wet product, which is suspended or fluidized, is carried upwardly in the drier, there is a noticeable tendency for the solids to be carried along in the central stream or channel, i. e., the middle of the drier, where there is the highest velocity gas stream. Upper spinning vanes 24 rapidly spin the fluidized mixture so that the particles are spread substantially evenly across the drying chamber, and the gases in the drier are maintained in contact with wet solids so that all the gas is utilized in the drying process.

Figure 2:
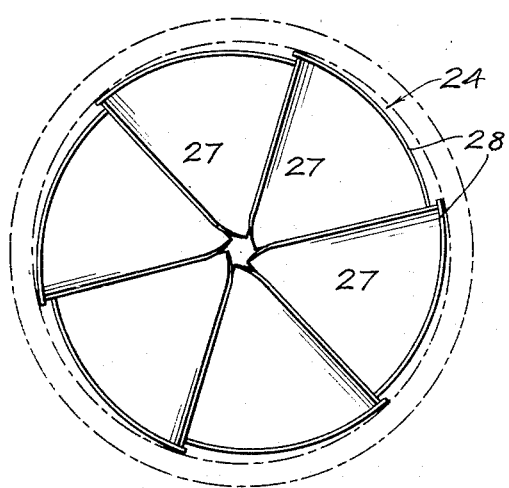
Figure 2 is a top plan view of the upper spinning vane for use in a drying chamber according to the invention.
Figure 4:
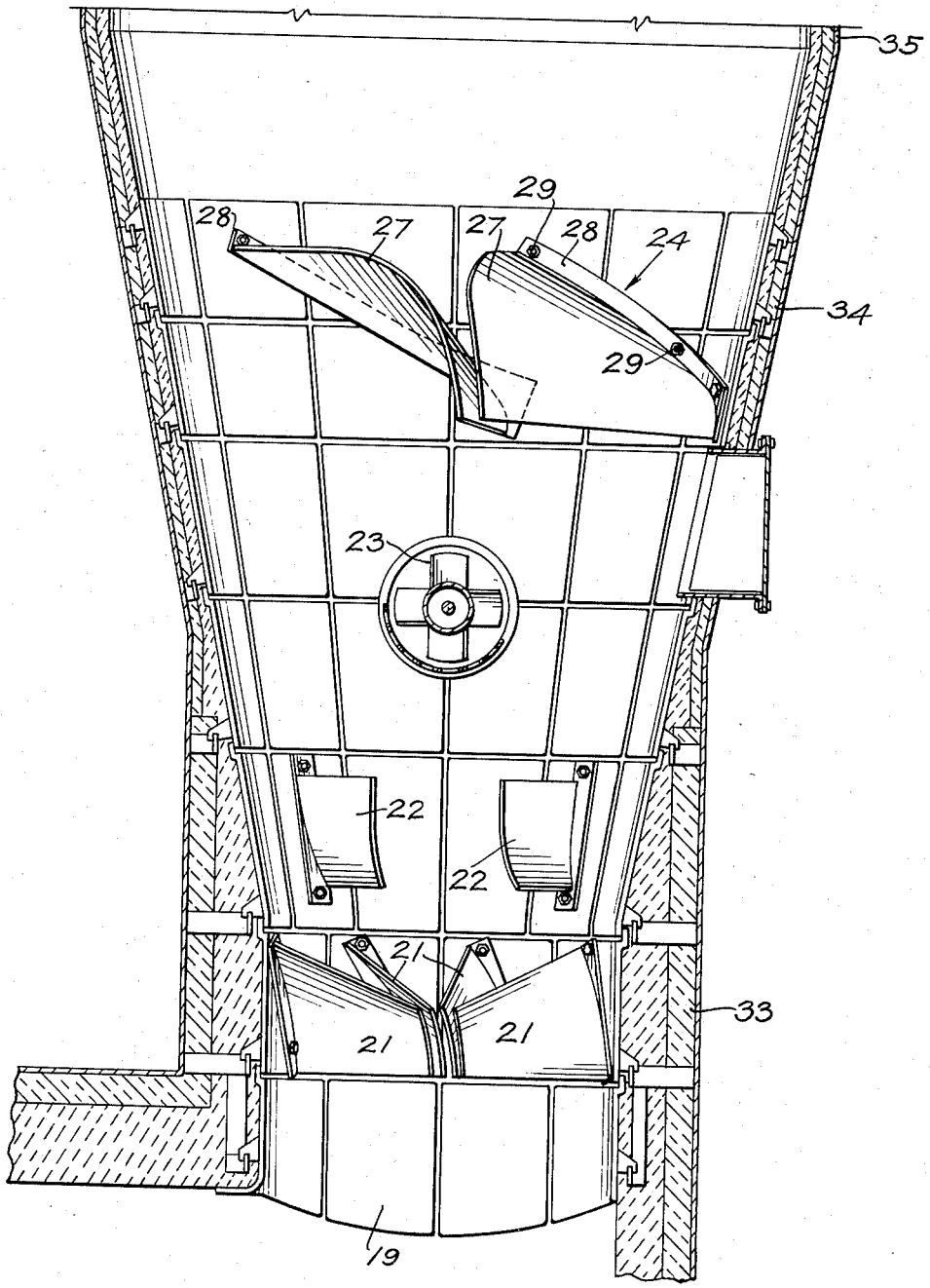
Figure 4 is a detailed cross sectional elevation showing the relative position of the vanes in lower portion of the drying chamber for directing rising gas therein.

The upper spinning vane assembly 24, illustrated in detail in Figures 2 and 4, includes six large vanes 27 which substantially encompass the internal area of the drier at the point of assembly of the vane. The vanes 27 are curved sheets which extend substantially to the middle of the drier and curve upwardly. The sheets are arranged to give a counterclockwise rotation to the gas and suspended product. Each curved vane is secured to a flange 28 which lies along and is bolted to the conical portion 34 of the drying chamber by means of bolts 29.

The drier 20, in general, includes a small cylindrical throat section 33, an inverted conical section 34, and a cylindrical main body section 35. The lower spinning vanes 21 are placed in the throat section 33, and the straightening vanes 22 are placed thereabove in the conical section 34 below the feed 23. The upper spinning vanes 24 are placed above the wet solids feed 23 in the conical section 34. In the preferred practice, the spinning vanes 24 are placed in the conical section of the drier so that the fluidized solid material is spread across an area which is slightly smaller than the maximum diameter of the main portion of the drier 35. Since there is a natural gradient of velocity across the diameter of any conduit carrying a fluid, maximum efficiency of utilizing the drying gases is obtained by spinning fluidized gas and solids. The upper spinning vanes spin the gas and suspended solids whereby the fluidized mixture rotates during its passage through the drying column from the vanes 24 to the outlet 25. By preventing channelling, the residence time of the solids in the drying chamber is increased, since the solids have a longer travel path at a lower velocity than in passing through the drier entrained in the high velocity channelled gases. Where surface moisture, for example, in washed coal, is the main moisture factor to be removed, channelling in the drier is not too undesired, since the surface moisture is quickly removed. With solids containing considerable inherent moisture, however, channelling will permit evaporation of the surface moisture, but substantially less of the inherent moisture is removed due to insufficient residence time of the solids. The channelling, therefore, carries out the solids which are still wet. The upper spinning vanes in the drier increase the length of travel and residence time of the wet solids in the drier so that the solids lose their inherent moisture as well as the surface moisture in the drying process.

Figure 3:
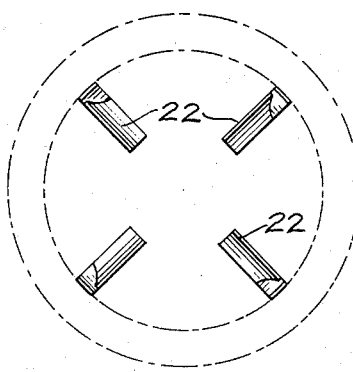
Figure 3 is a top plan view of straightening vanes for use in a drier according to the invention.

The straightening vanes 22, Figure 3, comprise a series of four vanes 22 disposed in the lower end of the conical section 34 to straighten the spinning gases passing up the drier from the lower spinning vanes 21. The straightening vanes 22 do not extend completely into the center of a column so that the gases passing up the center of the conical section may have a slight rotational movement which aids in suspending solids being distributed from the feed inlet 23. While the straightening vanes tend to cause a channelling of the gas rising in the column, the spinning vanes 24 prevent channelling through the main drier section.

In copending application, Serial No. 301,494, Robert L. Morrision, for Method and Apparatus for Drying Treatment of Solids in the Fluidized or Gas Entrained State, filed July 29, 1952, there is described apparatus and methods for drying granular solids having, in the main, surface moisture as the detrimental inclusion. Portions of such apparatus may be used with the present invention in drying finely divided solids containing inherent moisture as well as surface moisture. The furnace and separators, as well as the feed means, are fully described therein and are similar to and may be used in conjunction with the present device. The present device provides an improvement of the drying chamber therein described, and provides for a new and improved result in preventing channelling and increasing the residence time of the solids in the drier to remove inherent moisture as well as surface moisture.

While the invention has been described by reference to a specific device, there is no intent to limit the invention to precise details so illustrated, except insofar as set forth in the appended claims.

I claim:

1. In a gas-entrained drying chamber having a relatively small throat section opening into a lower conical portion in which wet granular solids are suspended in a rising high-velocity stream of drying gas and an upper cylindrical portion communicating with said conical portion in which suspended granular solids are dried and then carried out with the rising gas, the improvement which comprises a plurality of lower radial vanes mounted in the lower end of the throat section of said chamber and constructed and arranged to swirl entering gas and thereby disperse and entrain granular material fed into said chamber and to thereby prevent the downward discharge of falling material out of said throat section, a plurality of upper radial vanes mounted in the upper end of said throat section and arranged to stop the swirling gases leaving said lower vanes and provide a vertically rising stream of gas, feed means for granular material extending into said conical section above and in proximity to said upper vanes and arranged to feed a gravity flow of granular material into said chamber and a plurality of curved vanes mounted radially in the upper portion of the conical portion of the chamber above said feed means so as to swirl the gas and suspended particles for passage through the upper cylindrical portion of the chamber.

2. A chamber according to claim 1 in which each of said lower radial vanes extends into said throat a portion of a radius of said throat.

3. A chamber according to claim 1 in which each of said upper curved vanes extends across a radius of said conical section to thereby prevent an axially-aligned flow of gas through the upper cylindrical section thereof.

References Cited in the file of this patent

UNITED STATES PATENTS

| | | |
|---|---|---|
| 2,513,370 | Shaw | July 4, 1950 |
| 2,607,537 | Shaw | Aug. 19, 1952 |